(12) United States Patent
Stein et al.

(10) Patent No.: US 7,914,599 B2
(45) Date of Patent: Mar. 29, 2011

(54) SLAG CONDITIONER COMPOSITION, PROCESS FOR MANUFACTURE AND METHOD OF USE IN STEEL PRODUCTION

(75) Inventors: Joseph L. Stein, Gibsonia, PA (US); Brian J Stein, Valencia, PA (US); John Beatty, Montgomery, TX (US)

(73) Assignee: ISM, Inc., Wexford, PA (US)

( * ) Notice: Subject to any disclaimer, the term of this patent is extended or adjusted under 35 U.S.C. 154(b) by 1082 days.

(21) Appl. No.: 10/990,678

(22) Filed: Nov. 17, 2004

(65) Prior Publication Data

US 2006/0105901 A1 May 18, 2006

(51) Int. Cl.
*B22F 1/00* (2006.01)
*B22F 3/02* (2006.01)

(52) U.S. Cl. ............... 75/303; 75/327; 419/65; 419/66

(58) Field of Classification Search .............. 75/10.46, 75/10.47, 10.54, 10.58, 10.59, 10.6, 10.61, 75/303, 306, 313, 325, 326, 327, 746, 770, 75/771, 773; 419/65, 66

See application file for complete search history.

(56) References Cited

U.S. PATENT DOCUMENTS

| | | | |
|---|---|---|---|
| 3,396,010 A | | 8/1968 | Gould |
| 3,901,721 A | * | 8/1975 | Doman ............... 501/108 |
| 4,219,519 A | * | 8/1980 | Goksel ............... 264/82 |
| 4,451,293 A | * | 5/1984 | Kitamura et al. ....... 75/326 |
| 5,916,827 A | * | 6/1999 | Vayda ............... 44/580 |
| 6,375,711 B1 | * | 4/2002 | McCann ............... 75/570 |

FOREIGN PATENT DOCUMENTS

| | | |
|---|---|---|
| CN | 1241637 A | 1/2000 |
| GB | 2 199 025 A | 6/1988 |
| GB | 2199025 * | 6/1988 |
| JP | 55-115915 | 9/1980 |
| JP | 08-134526 | 5/1996 |
| KR | 100325115 B1 | 2/2002 |
| KR | 2003-0053401 | 6/2003 |

OTHER PUBLICATIONS

K. Kwong and J.P. Bennett, Recycling practices of spent MgO-C refractories, Journal of Minerals and Materials Characterization & Engineering, vol. 1, No. 2, 2002, p. 69-78.*
Briquetting with Roller Presses, Maschinenfabrik Koppern GmbH & Co. KG, 2000, p. 1-8.*

(Continued)

*Primary Examiner* — George Wyszomierski
*Assistant Examiner* — Mark L Shevin
(74) *Attorney, Agent, or Firm* — The Web Law Firm

(57) ABSTRACT

A slag conditioner containing MgO, carbon or a filler and a binder is mixed and formed under pressure to produce aggregates which can have the form of a briquette. The slag conditioner is used to improve the operating performance and refractory life in steel melting furnaces. A slag conditioner comprising by weight a mixture and 2% to 25% binder for bonded agglomerates or larger particles of said mixture, the mixture comprising: 20% to 90% burned aggregates comprised of particles less than 8 mm of which at least 30% is 0.2 mm or greater and containing between 35% and 94% MgO; up to 50% slag-making carbonaceous or other additive; and up to 50% light burned magnesite.

28 Claims, 9 Drawing Sheets

OTHER PUBLICATIONS

Pro-Slag® and Pro-Foam® Brochure in Cal-Mag®, vol. 2, Issue 1, May 2005.* M. Guzzon, et al. The behaviour of the secondary metallurgy slag in the EAF. Rev. Met. Paris. Apr. 2007, No. 4, p. 171-178.*

Rex McClanahan et al., entitled "Comparative Analysis of Dolomitic Lime and Chinese Magnesite Practices in Electric Arc Furnace Steelmaking Slags," AISE Conference, 2004.

Eugene B. Pretorius et al., entitled "Foamy Slag Fundamentals and their Practical Application to Electric Furnace Steelmaking," Electric Furnace Conference Proceedings, 1998, pp. 275-292.

R.J. Fruehan et al., entitled "Dissolution of Magnesite and Dolomite in Simulated EAF Slags," ISSTech 2003 Conference Proceedings, pp. 799-812.

"The Study on Steel Making Process with Electric Furnace by Using Bubble Former," Metal bulletin, Jun. 1997, pp. 9-10.

"There is no Genie in the Furnace! Dolomitic Lime has Superior Cost Performance Over 'MgO Based Slag Conditioners,'" Carmeuse Natural Chemicals Technical Bulletin.

"Steel Industry Dolomitic Quicklime," Carmeuse Natural Chemicals Technical Bulletin, 2003.

* cited by examiner

SLAG CONDITIONER COMPOSITION, PROCESS FOR MANUFACTURE AND METHOD OF USE IN STEEL PRODUCTION

CROSS REFERENCE TO RELATED APPLICATIONS

None

BACKGROUND OF THE INVENTION

The present invention relates to a composition useful for the making of steel, and more particularly to the composition of a slag conditioner, a method for producing such slag conditioner and a method of making steel and including stainless steel in an electric furnace using such a slag conditioner.

BACKGROUND OF THE INVENTION

Field of the Invention

Prior to 1960, silica brick was commonly used in the refractory linings of steel making furnaces such as open hearth or electric furnaces. The slag produced in the steel making process had a high in silicon dioxide ($SiO_2$) content, commonly known as silica. The slag was acidic for chemical compatibly with the silica brick of the refractory lining to ensuring reasonable lining life. A demand for increased steel quality and production in the early 1960's led to increased furnace operating temperatures beyond reasonable limits to the operating temperature of the silica brick in the refractory lining and thus reduced the useful life of the refractory lining.

The chemically acidic, silica linings, in open hearth and electric steel making furnaces were replaced by chemically basic linings made from materials based on magnesium oxide, MgO, and calcium oxide, CaO. The linings were principally in the form of bricks, mortars and other granular forms of maintenance materials. Even the newer Linz-Donawitz or Basic Oxygen Furnaces of the late 1950's started to produce steel on basic, MgO and CaO, furnace linings. The higher temperature and chemically basic lining materials were composed of burned dolomite and or dead burned magnesite where the principal compound is magnesium oxide (MgO) with some level of natural impurities. The chemical symbol MgO as used herein refers to products recovered from roasting natural magnesite ore in an oven, one product called light burned magnesite takes its name from the common process roasting the ore at a temperature of about 2000° F. for a desired period of time, and second product called dead burned magnesite takes its name from the common process roasting the ore at a temperature of about 3000° F. for a desired period of time. The compound MgO after dead burning develops an observable crystal, periclase, which is chemically resistant to high lime (CaO) containing furnace slag. Also useful in compositions with MgO based refractory brick was chrome ore, which was added for thermal shock resistance for linings in electric arc and open hearth furnaces. The practice of using chemically basic linings caused a chemical change to the slag floating on the steel. The chemical change was a higher lime (CaO) content to the slag for chemical compatible with the refractory lining materials. In addition, the high CaO content of the basic slag improved a necessary metallurgical function of collecting undesirable impurities from the liquid steel bath. Among these impurities better removed by basic slag are sulfur, phosphorus, and silicon depending on the grade of steel being produced.

Early in the 1960's when the lining life in a basic oxygen furnace was commonly in the range of 400 to 1200 heats, it was observed that slag at the end of the steel making process had between 5% and 7% magnesium oxide component. Those skilled in the art of steel making were aware of the implication of the slag composition related to refractory life. It is known from phase diagrams that magnesium oxide is soluble in calcium silicate based liquid slag and that the solubility level depended primarily on the CaO to SiO2 ratio ("C/S"), commonly referred to as lime-silica ratio. When the lime-silica ratio in the slag composition at the end of a heat was greater than 2/1, the slag was found to have a chemical imbalance requiring about 7% MgO to be satisfied. A relationship exists between lining material wear and MgO content of the slag. The maintenance materials of the furnace lining have a high in MgO content and became sacrificial donors of the deficient amounts of dissolving MgO to the slag, the damage to the lining limited the vessel campaign to between 400 to 1200 heats. Steelmakers, who added burned limestone for the CaO component in the basic slag, began to add burned dolomite or a blend of the burned limestone and burned dolomite to supply not only CaO but also MgO as a slag addition to satisfy the demand for MgO in the slag. Refractory lining life improved but wear remained a continuing problem requiring frequent refractory relining which interrupted steel production.

In the 1980's the lining life of BOF vessels was improved by changing the composition of slag for the steel making operations by increasing MgO content which made the slag more viscous. The presents viscous slag combined with the gas blowing capabilities of the BOF, resulted in a practice called slag splashing. A coating of the viscous refractory slag blown onto the furnace walls protected the vessel lining from excessive wear and was practiced after almost every heat. The steelmaking process could be carried out using the renewed slag coating on the refractory lining after each heat. This slag coating process extended the lining life in some instances to more than 10,000 heats in BOF furnaces and attempts were made to apply a similar concept of a slag coating process to the electric arc furnace. U.S. Pat. No. 6,514,312, issued Feb. 4, 2003 contains a disclosure of the slag splashing practice to a BOF vessel.

While dolomite was a common source for MgO into the slag, the furnace lining life remained relatively short and the consumption rate of the furnace maintenance material was relatively high. Dead burned magnesite replaced some of the dolomitic lime as a source of MgO in certain furnace slag in the late 1990's. Dead burned magnesite was added to the furnace charge as a relatively coarse material, typically 15×3 mm to minimize the dust that was generated during handling and charging of the material. It was thought inefficient and costly to introduce finer particles of dead burned magnesite because the small particles would be blown out of the furnace with the exhaust draft.

In order to coat the furnace lining for longer life and to duplicate the prolonged lining life in the BOF vessel, some form of splashing would be needed to propel the thickened slag on the furnace walls. A source of gas for splashing was oxygen pumped into the slag bath interface with a solid of fine, carbon containing material, usually petroleum coke, coal, or coke. The carbon was presumed to react with oxygen (burned or oxidized) or react with FeO in the slag, to create CO and $CO_2$. The gases formed by these reactions produced an effect of releasing gas bubbles into the slag, which caused the slag to increase in volume and produce what is now referred to as foamy slag. Foamy slag helps coat the furnace walls to some extent and reduced the lining wear further. Some improvements were recognized and thought to be cost effective in many steel mills.

However, even with these improvements, refractory brick lining life seldom exceeded 4 to 8 weeks. Extensive patching was needed during the furnace campaign. Bottom and bank repair material, usually in the form of dead burned magnesite grains, was consumed at rates from 2 to 8 pounds per ton of tapped steel. In addition, very expensive gun maintenance materials, also based on dead burned magnesite and even higher purity synthetic periclase, were consumed at rates from 2 to 8 pounds per ton of tapped steel.

Maintenance material, such as MgO based gunning mixes, bank and bottom grain materials, while their consumption was reduced, continued to be necessary to operate the furnaces and continued to represent a major cost to the steel maker. Further improvements were needed because the steelmaking process could be interrupted several times each day to apply maintenance materials, thus reducing productivity and production.

A special problem existed in electric arc furnaces that used direct reduced iron was a major source of iron for steel making process. After charging the direct reduced iron and any scrap and electric energy was introduced to the electrodes, the arc heating began to melt the scrap and direct reduced iron with an associated burden of tramp mineral impurities. The first material compositions to melt with the metal are low melting temperature silicates with relatively low lime-silica ratios. These liquids have an MgO solubility level that is relatively high, up to 20%, as determined by the melting points of compounds formed by the available reactive oxides.

Since MgO is a major component of refractory lining materials, any available MgO is taken into solution by the slag produced early in the steel making process. This explains an often-observed wear of the furnace lining including the lower sidewall, and the bottom of steel making furnace. A greatly needed improvement is required for steel making furnaces operated on charges that are high in iron content because of an unacceptable great wear of the furnace lining and very high maintenance requirements.

In recent years, dead burned magnesium oxide, typically 90% to 93% MgO grade in coarse aggregate, about 15×3 mm, was introduced to compete with the lime and dolime practice. The partial sizes of the aggregate 15×3 mm was sufficiently large to remain in the furnace as charged while supplying much of the MgO needed for the slag but at a higher flux cost. However, better foaming of the slag often resulted in limited a reduction of refractory costs which in some cases offset the added flux cost. The slag foaming practice devised by some steel making operations adopting a change to the practice of charging dead burned magnesium oxide while other steel making operations remained unconvinced of the economic advantages and continued the practice of introducing lime, or lime and dolime, or a blend of the two materials as a flux in the slag producing practice.

Attempts to produce a more economical material to replace dead burned magnesium oxide and/or dolime as a slag addition with a lower cost form of MgO used light burned magnesite, sometimes referred to as "caustic MgO," as the base material for a flux addition. Light burned magnesium oxide is relatively low cost and made from magnesite, a naturally occurring ore that is plentiful and easy to mine. The magnesite ore is burned at a low temperature, i.e. 2000 F, with low cost fuel, to drive off the carbonate in the magnesite, whose major component is magnesium carbonate, and yield MgO particles easily crushed and ground to a fine size as desired. Light burned magnesite was mixed with water to form a moldable mass compressed in to a briquette machine and allowed to dry or cure. The water formed a bond with the light burned magnesite and the resulting briquette was strong enough for transportation. The resulting agglomerates contained about 65% MgO, about 28% chemically held water as hydroxide, and ash from the magnesite ore. The light burned magnesite agglomerates were used in trials in a steel mill to make slag. Steel operators confirmed the presence of MgO in the slag compositions but did not observe any other benefits in slag condition, foaming or furnaces coating to consider the trial a success of even economical to continue.

All known attempts to enrich slag occurring during the steel making process with MgO by the addition of light burned magnesite in agglomerate or briquette form were unsuccessful. Another material was produced in the same way based on light burned magnesite and the addition of carbon in the form of coke with resulting composition containing about 20% carbon and 60% MgO. Trials of this material proved no more successful than trials of the light burned magnesite agglomerates alone, i.e., without the addition of carbon. The MgO content in the finishing slag compositions was detected but the slag failed to increase viscosity, commonly referred to in the steel making art as developing a creamy texture, and also failed to improve the desired slag foaming feature as compared with the prior practice of adding 15×3 mm coarse particles of dead burned magnesium oxide, to the slag.

Raw magnesite was added to light burned magnesite, carbon and water to make an agglomerated composition contained about 8% carbon, 60% MgO, 7% carbonate and 20% hydroxide. While this composition contributed MgO to the slag composition and produced a minor increase to foaming of the slag at some periods in the steel making process due to the evolution of gas produced by the decomposition of the raw magnesite, the composition tested failed to thicken the slag so that a stable foamy slag was produced or maintained. In these trials, the slag did not provide a useful coating on the furnace walls No apparent advantages were gained from the use of the finer more reactive light burned MgO with any composition, with or without carbon, with or without raw magnesite, as a substitute for dead burned magnesium oxide or dolime practice. Although MgO was detected in the slag, trials of materials based on light burned magnesite as the base material were failures.

The forgoing research into prior slag conditioning practices formed the basis for evaluating new materials in a series of trials designed to improve the slag composition in electric furnaces, but many serious problems and costly conditions remained. Linings continued to wear too fast. The wear was not uniform in that the slag lines suffered from a serious cut from corrosive slag compositions causing furnace linings to fail prematurely. Hot spots developed from flaring of the arc causing overheating, thermally shocking and cracking of, and bulk loss of the brick in these areas, was another cause for linings to be patched or replaced prematurely.

Further, when coal or coke was used as a carbon raiser, the amount of coal used exceeded the calculated amount to add carbon to the steel bath. When coal fines, coke, or petroleum coke was used as injection material to foam the slag, unusually large quantities seemed to be required to sustain a foamy slag condition. Furnaces with high transformer power could not consistently run at full power due to arc instability and resulting damage to the furnace walls. Heat times and power on times remained long. Excessive oxygen used to decrease heat time oxidized or burned too much iron and FeO levels in the slag remained too high and steel yield too low. Even with materials such as dead burned magnesium oxide and or dolime apparently adding MgO to the slag, maintenance materials continued to be consumed at an excessive rate. Energy costs and electrodes represented a significant part of the cost to make steel. Furnaces were extremely loud and annoying to operators even when wearing safety equipment related to hearing. The steel industry was under continuing pressure to reduce costs to remain competitive with foreign producers. Changes and improvements were needed.

Accordingly, it is an object of the present invention to improve the slag composition for increased efficiency by also reducing the heat time and reducing the energy required to melt and refine steel produced in an electric steel furnace.

It is a further object of the present invention to provide a slag conditioner composition useful to neutralize or at least offset an adverse chemical imbalance of a calcium silicate based slag occurring in a steel making process so as to significantly extend the lining life by rendering the slag less reactive and corrosive with furnace lining materials during the steel making process.

Another object of the present invention is to provide a slag additive useful to provide a useful constituent in slag to improve compatibly with the environment encountered in a specific steelmaking process.

Another object of the present invention is to alter a slag composition in a steel making furnace by the addition of a select amount of magnesium oxide to more economically create useful slag properties including an increased viscosity, creamy texture, and an increased ease for foaming useful to provide a protective coating on the furnace walls to extend the useful lining life.

Another object of the present invention provides a slag additive operative to allow a reduction in the charge of carbon while providing an improved carbon level retention by the finished steel product as tapped from a steel making furnace.

Another object of the present invention provides a slag additive operative to reduce the noise level and flaring from the arc during the operating of an electric steel making furnace.

Another object of the present invention provides a slag additive operative to improve the yield of chrome, silicon and other valuable alloying metals in the processing of stainless steels as tapped from a steel making furnace.

Another object of the present invention provides a slag additive operative to reduce the consumption of injection carbon in the form of anthracite coal, petroleum coke and the like, while maintaining or even improving the foaming of slag during and at the end of heats.

Another object of the present invention provides a slag additive operative to improve the slag practice in electric furnaces used for refining steel using iron sources such as, pig iron, hot molten iron, hot iron briquettes, and direct reduced iron.

SUMMARY OF THE INVENTION

According to the present invention there is provided a slag conditioner comprising, by weight, a mixture and 2% to 25% binder for bonded agglomerates or larger particles of the mixture, the mixture comprising: 20% to 90% burned aggregates less than 8 mm of which at least 30% is 0.2 mm or greater and containing between 35% and 94% magnesium oxide; up to 50% slag-making carbonaceous additive, and up to 50% light burned magnesite.

According to a further aspect of the present invention there is provided a magnesia carbon slag conditioner including by weight a mixture of size graded aggregates and 2% to 30% binder to agglomerate the aggregates, the mixture comprising: 40% to 80% dead burned magnesite; up to 40% light burned magnesite; 5% to 50% carbon selected from the group consisting of: coal; anthracite coal; coke; graphite and petroleum coke.

The present invention further provides a method of producing a slag conditioner including the steps of selecting by weight a mixture of size graded aggregates and 2% to 30% binder to agglomerate the aggregates, the mixture comprising 40% to 80% dead burned magnesite, up to 40% light burned magnesite, 5% to 50% carbon selected from the group consisting of: coal, coke, graphite and petroleum coke and compression of the mixture under a sufficiently high pressure to produce resulting shapes of at least 30×30×10 mm.

The present invention also provides a method of making steel in an electric furnace wherein the method including the steps of producing a high lime calcium-silicate slag during the a melting period and a refining period of heating a steel producing burden in an electric steelmaking furnace, introducing a slag conditioner comprised of by weight a mixture and 2% to 25% binder for bonded agglomerates or larger particles of the mixture, the mixture comprising 20% to 90% burned aggregates less than 8 mm of which at least 30% is 0.2 mm or greater and containing between 35% and 94% magnesium oxide, up to 50% slag-making carbonaceous additive, and up to 50% light burned magnesite to said electric steelmaking furnace in an amount needed to raise the MgO level in the high lime calcium-silicate slag to between 5% to 14% and thereby impart a creamy slag texture, non leaching for soluble MgO, foam producing to increasing slag volume, and protectively coat refractory sidewalls of the electric steelmaking furnace.

The present invention also provides a method of making steel including the steps of charging an iron bearing metal having high silicon content into an electric furnace, heating the electric furnace for a period of time sufficient to melt and decarburize the iron bearing charge and form a overlying layer of siliceous slag, calculating a total weight of a slag conditioner sufficient to yield an MgO content of more than 5% in the protective overlying layer of slag at time of finishing the refinement of the iron bearing charge in the electric furnace, the slag conditioner comprised, by weight, of a mixture and 2% to 25% binder for bonded agglomerates or larger particles of the mixture, the mixture comprising 20% to 90% burned aggregates less than 8 mm of which at least 30% is 0.2 mm or greater and containing between 35% and 94% magnesium oxide; up to 50% slag-making carbonaceous additive and up to 50% light burned magnesite, offsetting an affinity for MgO by the siliceous slag composition formed during the melting and decarburization of the iron bearing charge by introducing the calculated weight of the slag conditioner in the electric furnace during melting and decarburization of the iron bearing charge to form an enriched MgO protective slag, and foaming the enriched MgO protective slag to protectively coat wall of the electric furnace.

The present invention also provides a method of making steel including the steps of charging an iron bearing metal having high silicon content into an electric furnace, heating the electric furnace for a period of time sufficient to melt and decarburize the iron bearing charge and form a overlying layer of siliceous slag, calculating a total weight of a slag conditioner sufficient to yield an MgO content of more then 5% in the protective overlying layer of slag at time of finishing the refinement of the iron bearing charge in the electric furnace, the slag conditioner comprised, by weight, a mixture of size graded aggregates and 2% to 30% binder to agglomerate the aggregates, the mixture comprising: 40 to 80% dead burned magnesite, up to 40% light burned magnesite, 5 to 50% carbon selected from the group consisting of: coal, anthracite coal, coke, graphite and petroleum coke, offsetting an affinity for MgO by the siliceous slag composition formed during the melting and decarburization of the iron bearing charge by introducing the calculated weight of the slag conditioner in the electric furnace during melting and decarburization of the iron bearing charge to form an enriched MgO protective slag, and foaming the enriched MgO protective slag to protectively coat wall of the electric furnace.

The present invention also provides a method of making stainless steel including the steps of partially refining a charge of steel having selected alloying materials in an electric arc furnace, transferring the partially refined charge of steel to an argon-oxygen-decarburization vessel, operating the decarburization vessel to achieve final refining of the charge of steel including introducing a slag conditioner comprising by weight a mixture and 2% to 25% binder for bonded agglomerates or larger particles of the mixture, the mixture comprising: 20% to 90% burned aggregates containing at least 35% magnesium oxide, up to 50% slag-making carbonaceous additive, and up to 50% light burned magnesite.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

The slag conditioner composition according to the present invention may incorporate different size fractions of aggregate materials and formulations to supply MgO in an effectively sized crystalline form. An underlying discovery of the present invention is intermediate and fine sized crystals of magnesium oxide can be added to a furnace in an agglomerate form and enter efficiently into chemical reactions with liquid slag phase without detrimental loss of smaller sizes of magnesium oxide crystals to exhaust gases during the steel making process. Supplying MgO in the slag by the slag conditioner will save erosion of MgO from the high cost refractory brick linings, gunning repair mixes, and prepared granular bottom repair mixes of the furnace linings. An adequate MgO content in the slag also facilitates the use of relatively small amounts of carbon bearing materials to produce foaming of the slag for protecting the refractory furnace lining and enhancing the operation of the steel making furnace. As used herein dead burned magnesite commonly referred to as DB MgO is an economical source of MgO in a crystalline form made up of aggregates of periclase crystals, predominantly large crystals. These crystals are chemically known as magnesium oxide, MgO. Light burned magnesite commonly referred to as LB MgO is also source of MgO, however the magnesium oxide crystals derived from light burned magnesite are smaller and dissolve with greater ease in liquid slag than the magnesium oxide crystals of dead burned magnesite. The MgO constituent in the slag must be sufficient to saturate the slag with MgO thereby prevent absorption of MgO from other sources in the furnace. However, quantities of MgO in excess of the stoichiometric amount are to be present as a solid crystalline suspension to serve as a thickening agent to increase the viscosity of the slag and impart the desired creamy texture to the slag. The MgO held in suspension is most effectively supplied by the relatively larger crystals of MgO derived from dead burned magnesite or dead burned dolomite.

Figure 1:
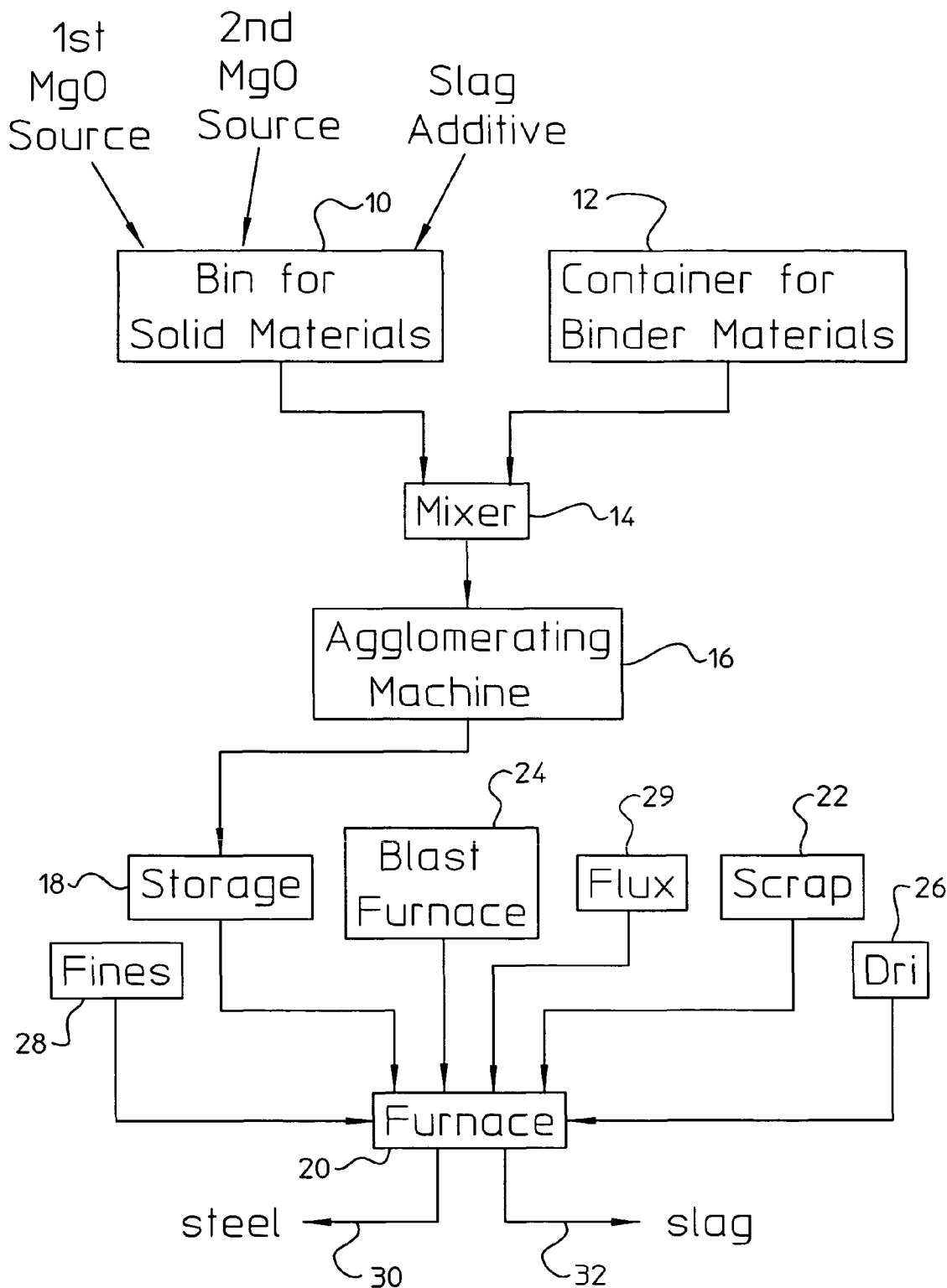
FIG. 1 is a schematic illustration of a steel making operation incorporating the present invention.

As shown in FIG. 1, according to the present invention the slag conditioner includes a mixture loaded in a hopper 10 of, by weight, 20% to 90% burned aggregates comprised of particles less than 8 mm of which at least 30% is 0.2 mm or greater and containing between 35% and 94% MgO; up to 50% slag-making additive; and up to 50% light burned magnesite. The slag making additive also introduced in the hopper 10, by weight, can be carbonaceous; preferably having carbon content between 78% and 99.8% and/or the additive can be a slag making compatible filler selected from the group consisting of: silicon carbide ferrosilicon; ferrochrome; ferrosilicomanganese; iron oxide; chrome ore; iron ore; mill scale; limestone; dolomite; raw magnesite sodium silicate; ligosulfonate; lignosulfonate solutions; hydrochloric acid; sulfuric acid; magnesium chloride; magnesium sulphate; molasses; pitch; tar; asphalt; resins; bentonite; and clays. When the slag making additive is carbonaceous, a particle size of less than 6 mm is useful and can be a size fraction of 5×0 mm, or a smaller size fraction of 3×0 mm, but the smallest size fraction is 1×0 mm. The carbonaceous additive can be selected from the group comprising coal; anthracite coal; metallurgical coke; petroleum coke; graphite and petroleum coke. A hopper 12 is supplied, by weight, with 2% to 25% binder for bonding agglomerates or larger particles of the mixture in hopper 10. The weighed quantity of binder can be a liquid such as water or selected from the group consisting of: sodium silicate; ligosulfonate; lignosulfonate solutions; hydrochloric acid; sulfuric acid; magnesium chloride; magnesium sulphate; molasses; pitch; tar; asphalt; bentonite; clays and resins, each with sufficient liquid to form a moldable mixture. Alternate binders to reduce or essentially eliminate the hydroxide binder formed by as the reaction product of water with caustic MgO component of the conditioner will not play a significant role in slag or steel making except to act as a temporary binder for the agglomerated particles, in one case, of dead burned magnesium oxide and coal. Organic binders using 6% water or less are useful to make briquettes in compositions of this invention. Low ignition loss binders permit a higher weight percent of useful steelmaking materials, i.e. MgO and carbon units. Another advantage of the use of low ignition loss binders is that the energy required to decompose hydroxides and/or carbonates from slag conditioners in the melting process is minimized, if not eliminated. The slag conditioner in briquette form can be designed to have a sufficiently low ignition loss so to be exothermic and thus will not deplete energy from the steel making furnace. Another advantage in the use of organic binders is that the need for light burned magnesite as a source for MgO can be replaced with additional dead burned magnesium oxide fines, which are more resistant to hydration, thereby making the life of slag conditioner briquettes longer in storage. The use of organic binders provides another advantage. Binders can be selected that contain little or no water. In this case, alternate materials sensitive to hydration can be employed in slag conditioners in the same particle size ranges. Those alternate materials include but are not limited to burned dolomite and dead burned dolomite. In compositions based on burned dolomite in place of dead burned magnesium oxide, the intermediate particles contribute reactive sources of MgO and CaO, both oxides being useful for steel making slag to produce similar useful results as those compositions based on dead burned magnesium oxide. Some slag conditioner formulations of the present invention provide that the burned aggregates are present between 40% to 80% and, in such a formulation, the light burned magnesite is up to 40% and the binder is between 2% to 25%.

The burned aggregate in hopper 10 may comprise particle less than 8 mm of dead burned magnesite preferably containing between 80% and 94% MgO. The size range of particles comprising the dead burned aggregate is further defined by a size fraction of 6×0 mm at least 30% being larger than 0.2 mm, preferably the particles are within the range of about 5×0 mm, most preferably a 3×0 mm size fraction but a size fraction of 1×0 mm and includes fines is also suitable. The MgO constituent of the dead burned magnesite and the light burned magnesite may be replaced with burned dolomite aggregate. The smaller crystals of MgO occur in light burned magnesite particles and comprise at least 80% and not more than 97% MgO in magnesite particles less than 100 mesh, preferably less than 200 mesh to promote the desired ease of dissolution in the slag bath occurring throughout the refining of a heat of steel. The dead burned aggregate may consist of dead burned dolomite and the slag conditioning mixture further include light burned dolomite, each providing a sources of CaO and MgO components to the chemistry of the slag to reduce the sulfur content of the refined molten steel.

The 20% to 90% by weight of burned aggregates in hopper 10 are comprised of two constitute parts, first part are in a size fraction of less than 8 mm with at least 30% of the aggregates being 0.2 mm or greater and containing 35% to 94% MgO, preferably between 80% and 94% MgO and the aggregates of the second part are in a size fraction of up to 50% light burned magnesite containing more than 85% MgO and having a particle size less than 100 mesh and more particularly about 80% or more particles less than 200 mesh. The two constitute parts are separately measured by weight and then loaded into a hopper 10. Dead burned magnesium oxide fines can be used beneficially to lower ignition losses and replace light burned magnesite as a component in a slag conditioner in the briquette form.

Carbon from the dense agglomerates or briquettes of this invention, or particles derived from such agglomerates, react in a more efficient way in the steel making process in an electric furnace including a very effective reducing of slag components to increase the yield of metals such as iron from iron oxides normally found in steel slag. The slag making additive can be carbonaceous, preferably having carbon content between 78% and 99.8%, and/or the additive can be a slag making compatible filler. The measured quantities of burned aggregate and slag additive in hopper 10 and the binder in hopper 12 are loaded into a suitable mixer 14, such as a muller, ribbon, or auger mixer. The mixer 14 is operated for at least two minutes until the aggregates and binder are uniformly dispersed and tempered to form a moldable mass. The tempered mass is then loaded into an agglomerating machine 16, such as a high-pressure briquette press to produce solid 60 mm square briquettes between 30 to 40 mm thick. The briquettes of slag conditioner of the present invention may be formed in other sizes, such as 30×30×10 mm; 40×40×20 mm; 60×40×20 mm; 70×50×40 mm. Other suitable forms of machines 16 for forming agglomerates are a mechanical press, a hydraulic press, a friction screw press, a rotary press, an inclined pelletizing disc and an extruder, all per se well known in the art. The briquettes develop an adequate strength for handling after curing and partially drying in storage room 18 maintained at temperature suitable to promote bonding by operation of the binder and evaporation of residual water, when the binder is aqueous, for example about three days. The density of the briquettes typically exceeds 1.8 g/cc and attains a crushing strength measured according to ASTM test methods modified for 2 cm cubes, to exceed 2000 pounds per square foot. The resulting agglomerates are suitable for charging into an electric furnace 20 with iron bearing charge material and fluxes such as burnt lime to alter the chemistry of the slag occurring during the steel making operation. Slag conditioning briquettes with a moisture content of over 3%, such as can be acquired from outside storage will significantly increase power consumption in large high powered DC furnaces, however the briquettes can be used with no apparent power loss at slower lower power furnaces because the briquettes have the chance to dry in the presence of the hot waste gasses before the melting process occurs.

The iron bearing material can comprise one or more of scrap from a scrap charger 22, liquid iron or pig iron from a blast furnace 24, direct reduced iron (DRI) from a furnace 26, and other sources of iron such flue dust fines from storage bin 28. It is common to make steel from scrap steel. In locations where scrap steel is poor quality, in short supply or too costly, prepared iron is used as the metal charge. Iron is preferred as the metal source in order to make the quality steel in the manufacture of special grades of steel requiring low contents of critical elements such as copper, nickel and tin. A metal source with high iron content is direct reduced iron pellets or hot iron briquettes made from iron ore reduced in a process with natural gas. Other forms of more pure iron can be from pig iron and blast furnace iron. When the iron charge has high silicon content the early slag also has high silica content and known to be very corrosive on basic or MgO based refractory linings and maintenance materials.

Figure 4:
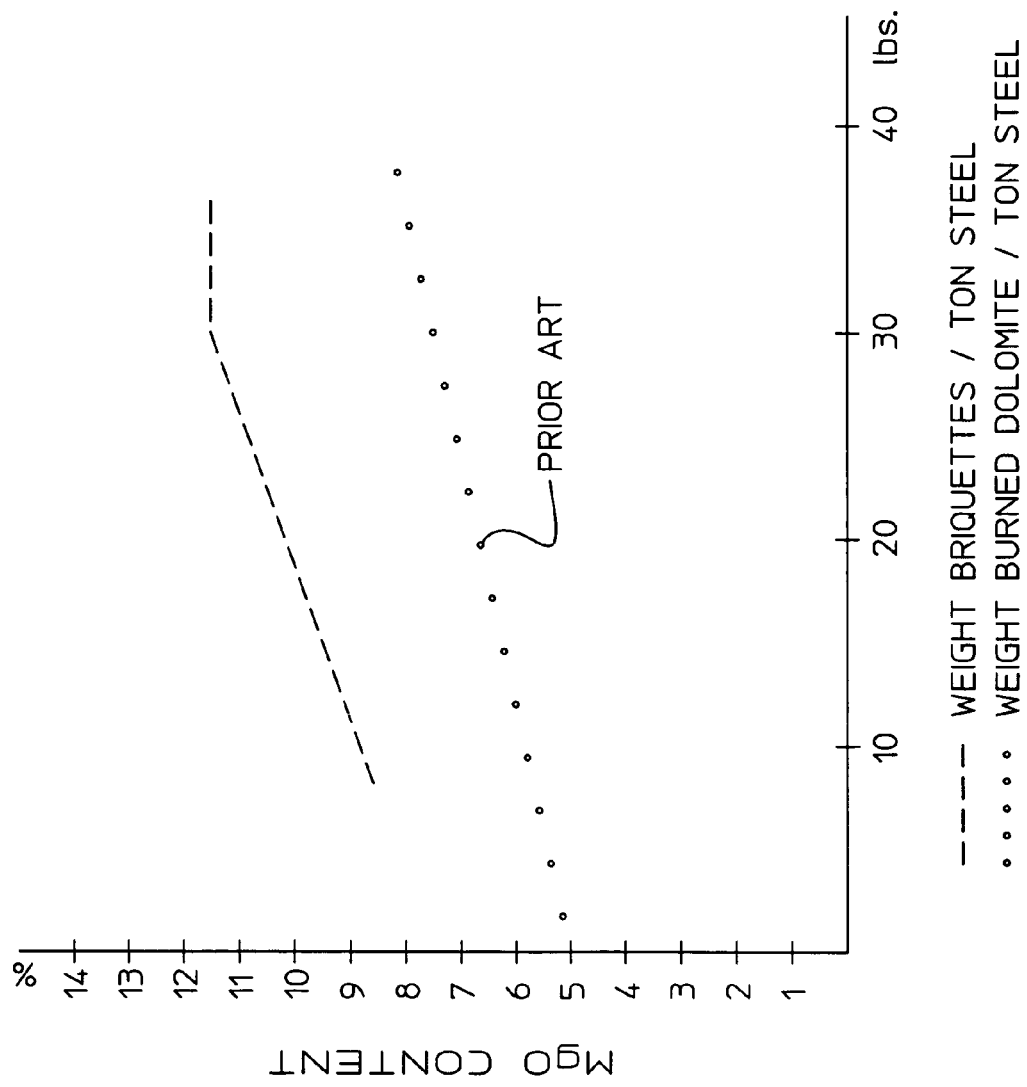
FIG. 4 is a set of curves representing the MgO content in molten slag obtained by the addition of MgO briquettes and the addition of burned dolomite.

In the operation of the electric furnace 20, the iron charge is accompanied with a charge of flux from bin 29 and a charge of slag conditioning briquettes or aggregates of the present invention to maintain the desired MgO content in the slag throughout the steel making operation. The slag appearance exhibiting a creamy texture is a reliable indicator of a surplus of solid MgO crystals which increase the bulk viscosity of the liquid slag. Foaming of the slag by the injection of surprisingly smaller quantities of carbon is sufficient to produce a reaction with the oxygen blown into the furnace or by reaction with FeO in the slag to release CO and $CO_2$ gases to cause a slag to foam. However, when the carbon particles are supplied by the briquette, the carbon is altered to the form of dense particles that penetrate deep into the slag bath so that the reaction with FeO or oxygen creates gas in a position to better foam the slag. The role of the carbon component of the briquettes of this invention, when used in conjunction with the correct type and size of MgO source materials, is associated with a particle of high density in the briquette. Even when the briquettes are crushed and injected as fines, the carbon is associated with a dense, but a finer particle size. Most unexpectedly, the carbon associated with higher density particles from the briquette compositions is consumed very efficiently in the steel making process. As shown in FIG. 4, the briquettes of this invention often provided between 8.5% to 12% MgO to the slag whereas the MgO content of a slag was normally a maximum of 8%, using dolime or dead burned magnesium oxide, sized 15×3 mm.

Figure 3:
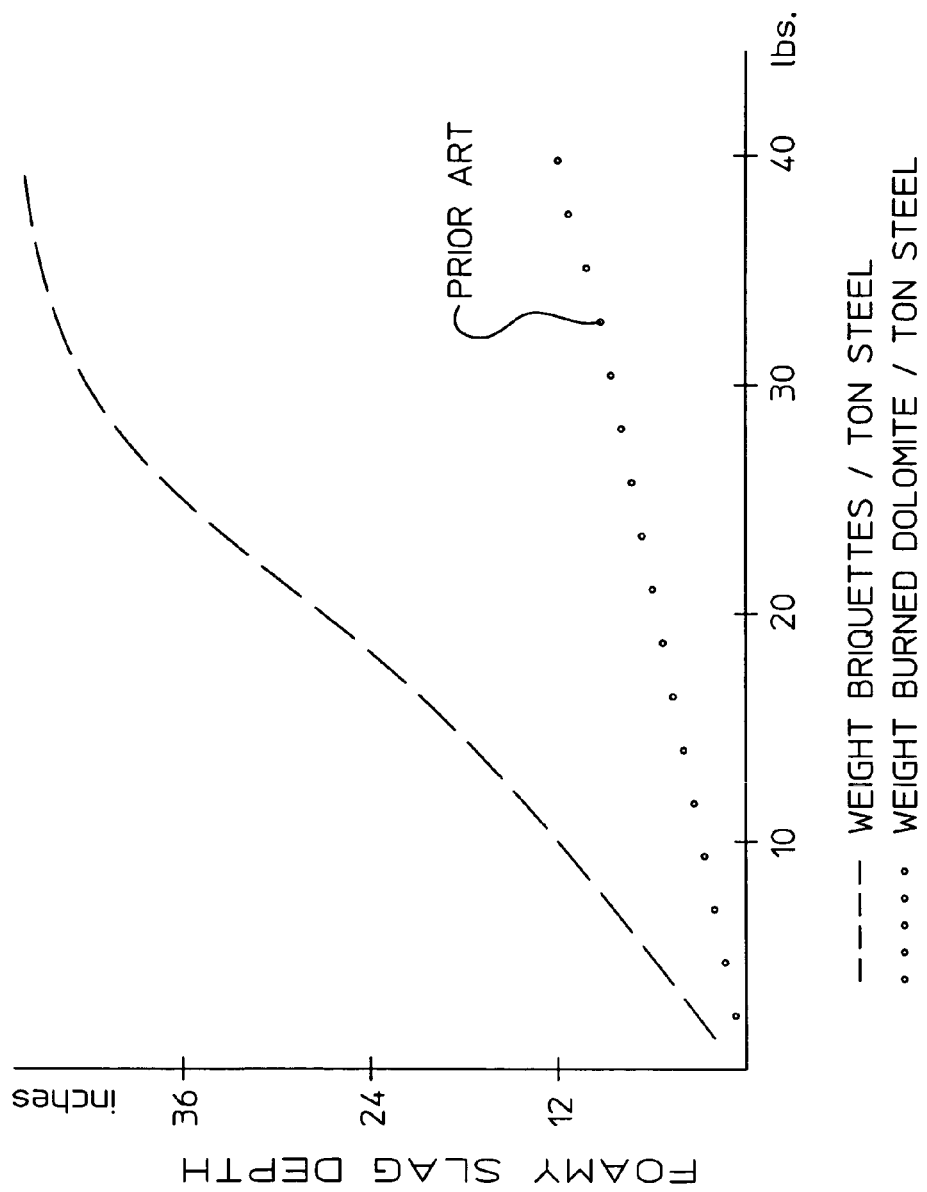
FIG. 3 is a set of curves representing the slag volume obtained by the addition of MgO briquettes and the addition of burned dolomite.

By way of example, a slag conditioner composition containing 25% coal, particle sizes about 3 mm and finer yields 20% carbon in the aggregate. In this composition, the agglomerate is a briquette, preferably a 40×40×25 mm in size. When this carbon component is part of the briquette, the carbon is carried into the slag bath or interface with the steel due to the high bulk density of the agglomerate or briquette. Coke weights from about 18 to 30 pounds per cubic foot. The briquette bulk density is over 70 pounds per cubic foot. The agglomerates and/or particles from the agglomerates penetrate to a position deep into the slag or metal-slag interface where the supply of the carbon increases the carbon in the steel bath to the desired tap level. The carbon in this dense form will increase the carbon content of the steel much more efficiently than carbon from other conventional sources, such as charge carbon from coarse coal, charge carbon from coarse metallurgical coke, carbon from injection carbon in the form of coal, anthracite coal, petroleum coke and the like. Essentially carbon from the briquettes provides carbon to the steel 2 to 4 times more efficiently than other carbon forms. The gas bubbles, in conjunction with the thicker, creamy, slag saturated with MgO and solid particles of intermediate MgO, form a surprisingly better, higher foam and longer lasting foam than prior practices where injection carbon is blown into the furnace, presumably into the slag or steel bath slag interface. Another advantage to the use of briquettes of this invention is in the control of the wear of furnace linings due to optimizing the foaming and stability of MgO saturated slag and the coatings formed on the furnace walls and in some cases the roof, because of the forming and foaming of the viscous creamy slag. The graph of FIG. 3 serves to show that increased depth of the foamy slag that is better, longer lasting foamy slag at the increased slag volume, rising higher during essentially all the power on time during the heat. The result is a shielding of the electrode or electrodes and a directing of the arc into the steel bath, minimizing the time the arc is wild ("flare") and bouncing off, over-heating and thermally shocking the refractory wall brick. During this period of maximum foaming of the slag, the furnace can be operating at or near full power and is relatively quiet compared to furnaces operating without good foamy slag.

Figure 5:
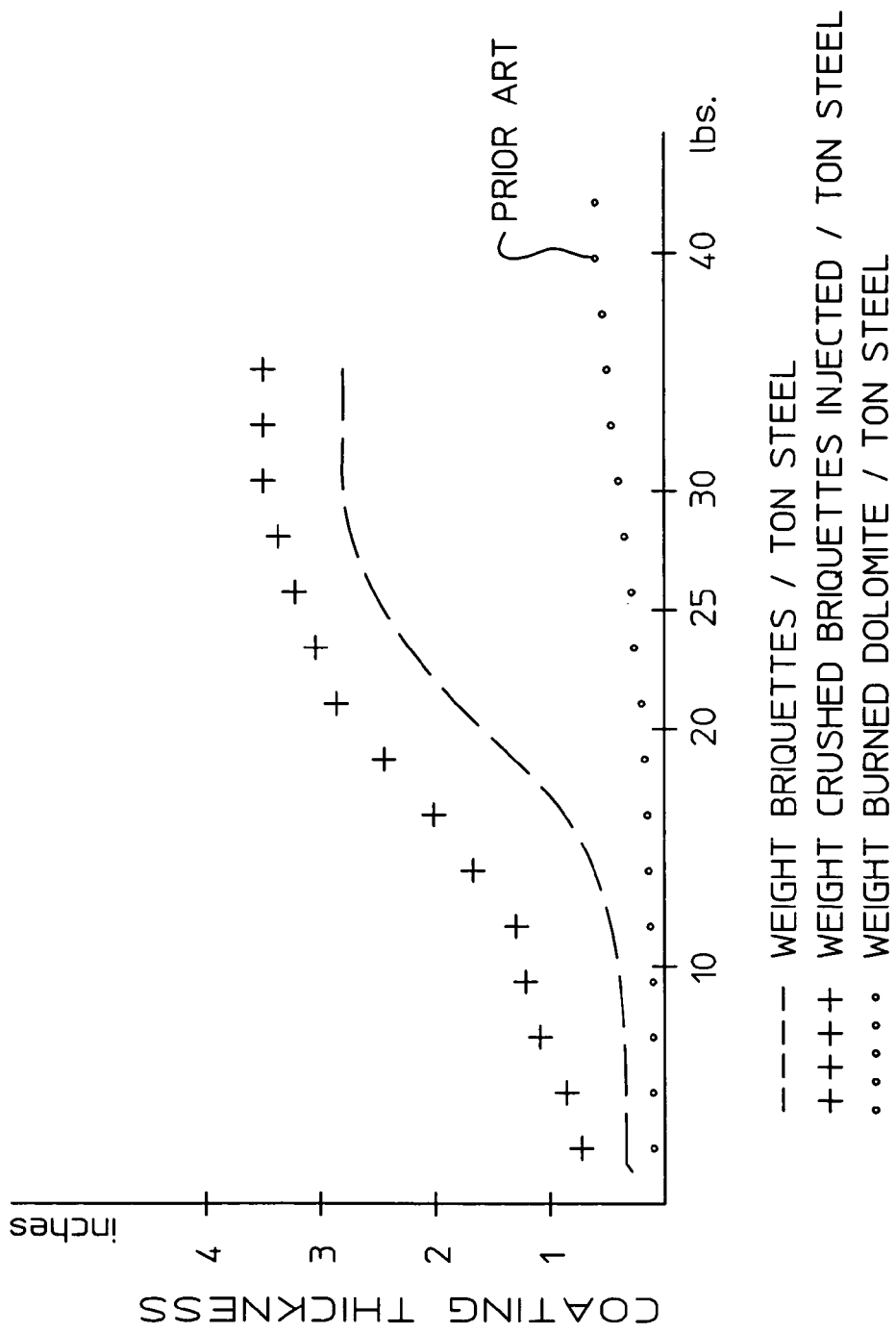
FIG. 5 is a set of curves representing the thickness of slag coating on the furnace wall obtained for the addition of MgO briquettes, the addition of crushed MgO briquettes and the addition of burned dolomite.
Figure 6:
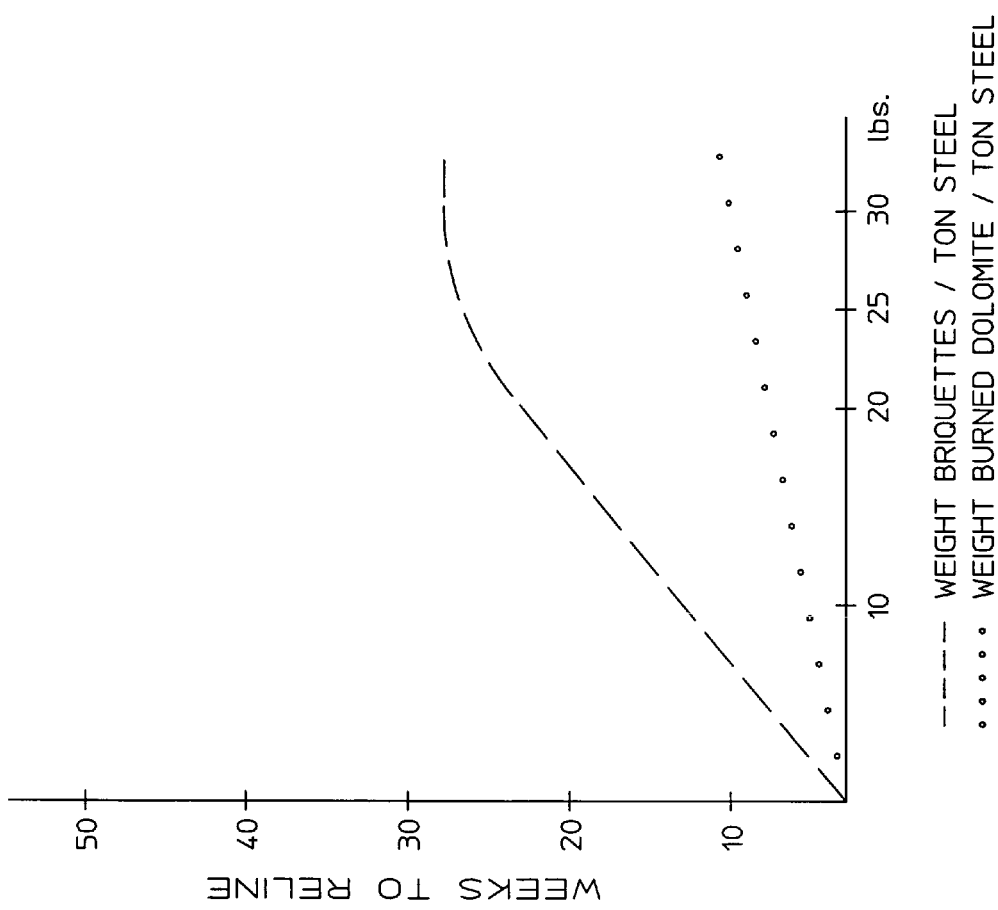
FIG. 6 is a set of curves representing the refractory lining life obtained by the addition of MgO briquettes and the addition of burned dolomite.

At the end of each heat, the walls are heavily coated with stable refractory layer. FIG. 5 illustrates the graph lines for obtaining the superior thickness slag using either briquettes or crushed briquettes as compared burned dolomite. On the next heat, as early slag forms, if there is shortage of MgO in the slag, the early slag is supplied with the required MgO from the sacrificial coating thus formed on the furnace walls from the previous heat. Thus the thickness of the slag coating is an important consideration and not controlled by the prior art practice using burned dolomite as shown in FIG. 5. At the conclusion of the steel making operation, liquid steel is tapped at line 30 and residual slag is removed at line 32. As shown in FIG. 6 when operating a furnace in this manner, the refractory wear is significantly reduced which includes the brick lining as well as maintenance materials. At about 25 pounds of briquettes per ton of steel, the maximum benefit to the lining life is achieved, in excess of six months, a significant improvement to life to the furnace lining by replacing burned dolomite with the slag conditioner of the present invention.

Figure 7:
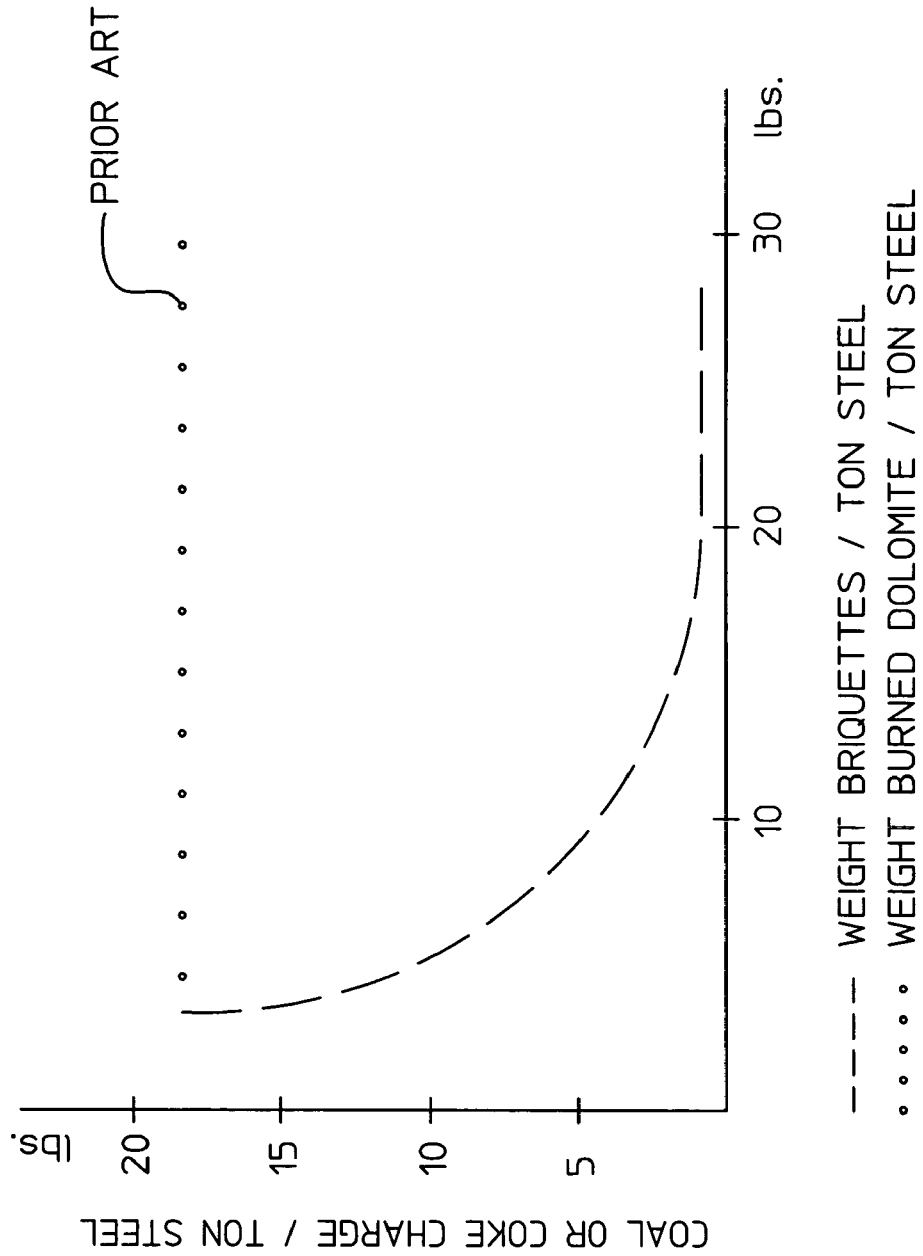
FIG. 7 is a set of curves representing the reduction to the required charge carbon obtained by the addition of MgO briquettes, the addition of dead burned MgO and the addition of burned dolomite.

FIG. 7 illustrates the benefit of the carbon retained in the metal bath is elevated by the carbon of the slag conditioner so that charge carbon, normally added in the form of coarse coal, could be reduced by up to 50%. Due to the better, and longer lasting foamy slag, the injection carbon could also be reduced. In one of the tests, the injection carbon was reduced from over 25 pounds per ton of tapped steel, to less than 10 pounds.

Figure 2:
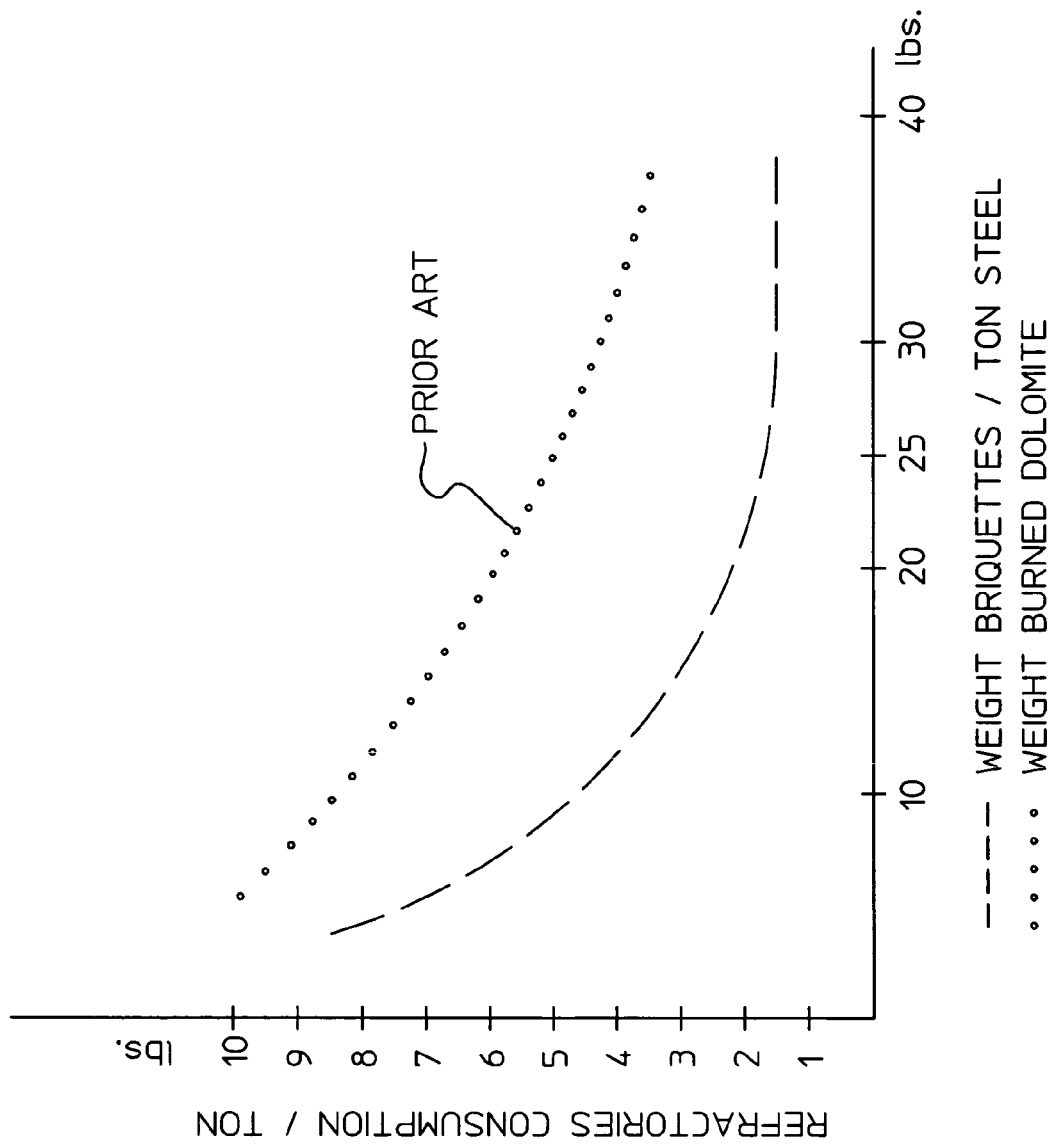
FIG. 2 is a set of curves representing reduced lining maintenance for the addition of MgO briquettes and the addition of burned dolomite.

As shown in FIG. 2 the consumption of maintenance materials, MgO grains for bottoms and banks and MgO based gun mixes for walls and hot spots, was significantly reduced in some cases reduced by 50%. The graph lines labeled PRIOR ART in FIG. 2 serve to emphasis to need for continued furnace relining expense in the steel making furnace.

An experimental slag conditioner composition A for agglomerates is comprised of: 50% dead burned magnesium oxide having a particle size in the range of 3×0 mm, 60% of the particles larger than 0.2 mm, containing between 90% and 92% magnesium oxide; 25% light burned magnesium oxide; 25% carbon in the form of coal, 1×0 mm size; and 12 to 16% water as a binder. The composition was processed in the same manner as described above and identified in FIG. 1. Trials in a steel mill were conducted. The briquettes were added to the electric furnace during the scrap charge period. The benefits observed in the trials confirmed the slag conditioner composition produced the desired MgO constituent in slag, foamy stable slag, good furnace wall coating, reduced the charge and injection carbon, and improved refractory life. Additionally, two trials were carried out in furnaces operated to tap steel at very high temperatures in excess of 3100° F. after a long oxygen blow. One trial used a 28-foot diameter furnace and the second trial used a smaller diameter furnace. The results demonstrated all the benefits of the earlier trials were realized.

Additional trials were carried out in electric furnaces where the furnace slag occurring in the melting and refining of stainless steel grades was traditionally difficult if not impossible to foam. In addition, the finishing slag was low in CaO to $SiO_2$ ratio to final reduction steps where strong reducing agents such as silicon carbide are introduced in the slag to further reduce chrome oxide so chrome metal recovery in the metal is maximized. Slag made in the process of making stainless steel is typically low in CaO to $SiO_2$ ratio, normally very flat appearing, very fluid, and corrosive to the furnace linings and maintenance materials. The making of steel from an iron bearing charging metal having a high silicon content, such as high in silicon oxide, in an electric furnace having an MgO based refractory lining. An overlying layer of siliceous slag is formed after heating the charge metal in the electric furnace for a period of time sufficient to melt and decarburize the iron bearing charge. A calculated a total weight of a slag conditioner sufficient to yield an MgO content of more then 5%, preferably between 7% and 14%, in the protective overlying layer of slag at time of finishing the refinement of the iron bearing charge is added to the electric furnace to offset an affinity for MgO by the siliceous slag composition formed during the melting and decarburization periods and form an enriched MgO protective slag. The iron bearing charge metal can be selected from the group consisting of: scrap; molten iron; direct reduced iron; pig iron; and flue dust fines. When additionally the furnace is charged with alloying materials to produce a desired grade of stainless steel, the calculated total weight of a slag conditioner is added to yield an MgO content of between 12% and 21% and a final CaO to $SiO_2$ ratio less than 1.8. The carbon of the conditioner is sufficient to improve the yield of chrome and silicon metals in the steel by reducing oxides of chromium and silicon.

Dolime is magnesium rich burned lime and was traditionally added in the prior art practice to the slag early in the heat to provide MgO units. Large lumps of dolime/burned lime could be observed floating on the liquid slag up to ten minutes into the heat. The solid chunks of dolime obviously do not enter fully into the liquid slag composition at this stage of the heat. By way of comparison, in the trial using the composition A, the briquettes did not create the same dry lumpy condition on the slag and were thought to react earlier when needed to neutralize the slag. These observations were supported by the observation that the slag foamed during the heat to a depth of about one foot, and the furnace lining appeared to be coated for much of the heat. The life of the linings was observed to be longer and the use of furnace lining maintenance materials was significantly reduced. The trial of composition A in a stainless steel producing furnace was the first time a slag on stainless steel has been successfully foamed and the walls coated. The overall savings more than offset the increased cost of the fluxes compared to the former dolime practice.

Figure 8:
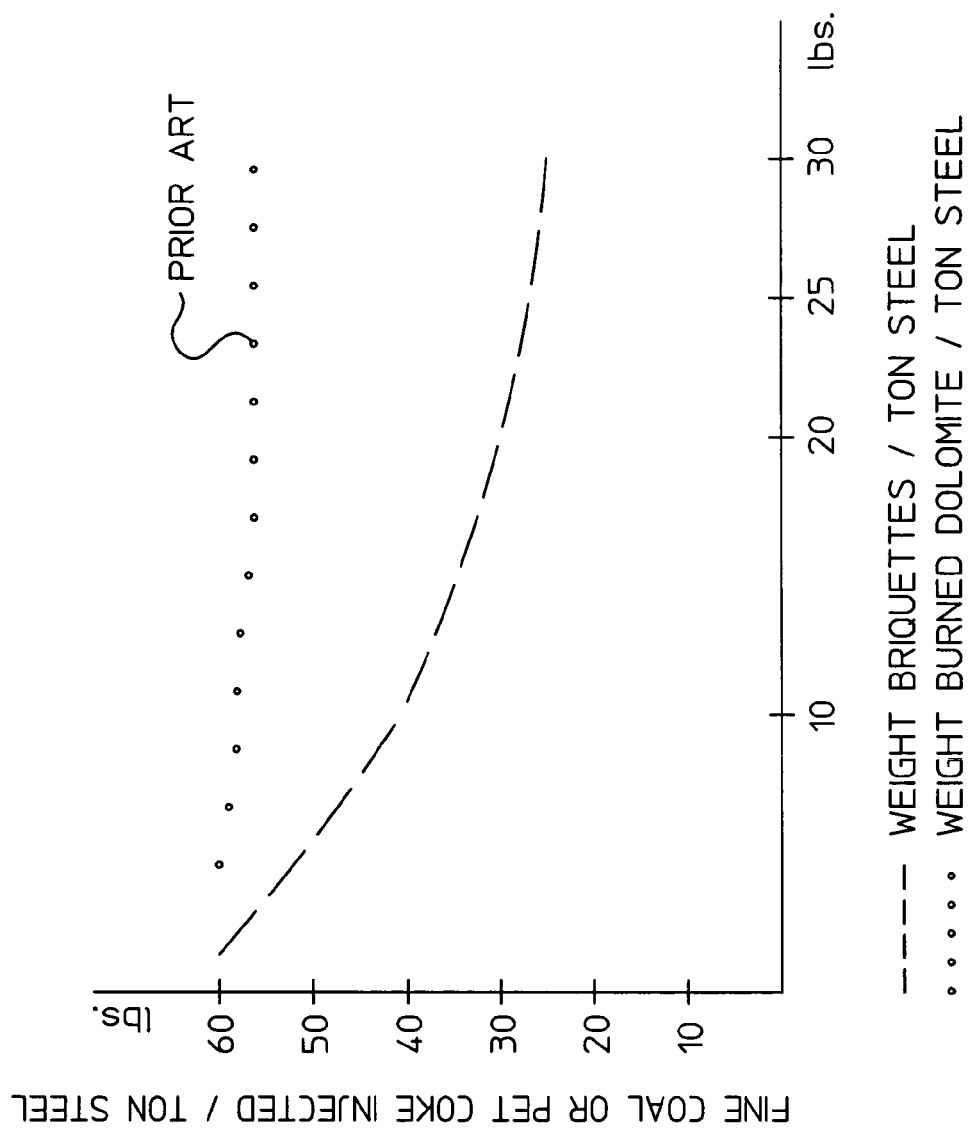
FIG. 8 is a set of curves representing the reduction to the injected carbon for foaming slag obtained by the addition of MgO briquettes, the addition of dead burned MgO and the addition of burned dolomite.

In another trial in a furnace making steel from prepared iron, special conditions were encountered. In trials where direct reduced iron and/or hot briquettes iron were the charge materials, briquettes of this invention, composition A, were added to the furnace to replace either dolime or dead burned magnesium oxide if that was the practice at the time. It was observed that less weight of briquettes was needed than calculated to provide the MgO needed to satisfy the slag. The slag foamed earlier and coated the furnace. As shown by the graphs of FIGS. 7 and 8 the charge and injection carbon were reduced by up to 50%, the consumption of refractory maintenance materials was reduced by 25% and the linings lasted longer. In effect, the briquettes of this invention neutralized the early siliceous slag and the improved the economical operation of the steel making process.

An experimental slag conditioner composition B comprised of: 0% light burned magnesium oxide; 50% dead burned magnesium oxide having a particle size of 6×0 mm, 70% particles larger than 0.2 mm; 25% dead burned magnesium oxide fines, 100 mesh; 25% carbon in the form of coal, 1×0 mm size; 8% water added as a plasticizer to make the mix moldable; and 7% lignosulfonate as an organic binder. The composition was processed in the same manner as above except the briquettes were dried with warm air @ about 40° C. for a period of three days. The final product analysis was MgO 68% and Carbon 18% with a loss on Ignition of 8%. The briquettes were used in trials using the steel making furnace with the 28-foot diameter operated at unusually high tap temperatures and where previously the slag coating was unsatisfactory. In one case, 4000 pounds of briquettes were charged with each heat of scrap as calculated to provide a target MgO content in the slag of 10% minimum. The MgO levels desired in the slag were met. The slag foamed very well and while retaining a creamy consistency, coated the sidewalls to such an extent that the brick joints could not be identified. All other improvements were retained of reduced charge and injection carbon as shown in FIGS. 7 and 8. By way of another example, a continuously fed, periodically tapped DC furnace "preheater" type furnace was operated using dolime as the MgO source. In a modified practice, part of the dolime was replaced by crushed sized briquettes having a particle size of 5×0 mm where less then 10% of the particles were finer than 0.1 mm and 95% were finer than 5 mm. This granular material was introduced to the furnace through pneumatic injection equipment at the rate of 1300 pounds per heat, including during the last ten minutes of the heat prior to tap. As expected from the graph of FIG. 5, the slag was extremely creamy and foamed very high covering the cups on the face of water-cooled panels, where slag seldom is observed. After tapping the steel, the furnace walls were observed to retain the slag coating and the coating was complete on the sidewalls, upper sidewalls and on the walls above on the water-cooled panels. In this case, the furnace was operated continuously for one shift without the maintenance that is usually required. After a week of operating, the furnace required only minimal maintenance. This demonstrated the utility of a granular form is equally useful to supply of the MgO and carbon material by the slag conditioner composition B, and the surprising and unexpected results from the application of briquettes and crushed material of this invention.

As shown in FIGS. 7 and 8, in a prior practice, an addition of between 17 and 18 pounds of coal or coke per ton of steel typically totaled 2000 pounds or more of charge carbon was needed to raise the final carbon content of the steel at tap time. By way of example, if the normal tap carbon content was 0.07% C with dead burned magnesium oxide as the source of MgO, then after trial heats with the briquettes comprised of any of the slag conditioner compositions of this invention, the carbon content was between 0.08% and 0.10%. This level of carbon is not needed and sometimes not even acceptable in the finished steel, causing a reduction to the charge carbon, typically from 2000 pounds to less then 1250 pounds or even lower to produce some steel grades. This discovery demonstrated that carbon from the briquettes contributed carbon to the bath of metal more efficiently than from charge carbon. It was determined that the amount of MgO in the slag could be achieved with less than the calculated required weight of briquettes, and the amount of carbon in the steel could be maintained with the carbon from the reduced weight of briquette. In many cases, the addition of briquettes was reduced, making additional savings in flux costs possible. The surprising results gave rise to the possibility that further improvements and related savings may be possible.

Taking into account the observation that both MgO and carbon was being provided to the steel making process more efficiently through the use of the agglomerate of finer materials in the form of a briquette, it was discovered that the purity of the MgO source, the particle size and the density of the grains are important factors controlling the solubility of the MgO units into the slag. Therefore, the dead burned magnesium oxide used in the slag conditioners of this invention shall be not more than 94% MgO purity, and have a grain bulk density or bulk specific gravity of not more than 2.25 g/cc. This observation explains why crushed used refractory brick especially brick containing fused MgO of any size does not provide the expected benefits of slag conditioners, even compared to dolime, dead burned magnesium oxide 15×3 mm.

Experimental compositions were designed to contain even coarser dead burned magnesium oxide particles. Dead burned magnesium oxide of the same 90% to 92% MgO purity is useful but screened to a particle size fraction of 3×0 mm, wherein 50% to 90% of the particles are retained on a 0.2 mm sieve, having about 20% to 50% or more particles less than 3 mm but retained on a 1 mm sieve. Briquettes produced with 50% 3×0 mm dead burned magnesium oxide and 25% light burned MgO fines, with 25% coal, and adequate water added for a binder were agglomerated in a briquette press and cured in the same way as the agglomerated mixes described hereinbefore. The briquettes containing this coarser dead burned magnesium oxide particles were used as slag conditioning additives and produced the same benefits of adding MgO to the slag and carbon to the steel were noted. Additionally, the slag foamed even better and retained the foamed condition longer and coated the furnace walls better including creating a coating high on the water cooled panels above the refractory sidewalls and parts of the roof.

As shown in FIG. 8, it is believed that fine carbon particles injected into steel making furnaces according to the prior art practice for foaming slag, are forced out of the furnace to some degree with the high velocity drafts or exhaust gasses known to exist. In addition, the fine carbon particles are lightweight, as low as 20 to 30 pounds per cubic foot, and float above or actual burn or combust over the slag as opposed to entering the slag bath or slag metal interface where the oxidation releases gases that will also contribute to foaming the slag. Thus injecting large quantities of coal or petroleum coke in the prior art practice is a costly, ineffective practice.

Figure 9:
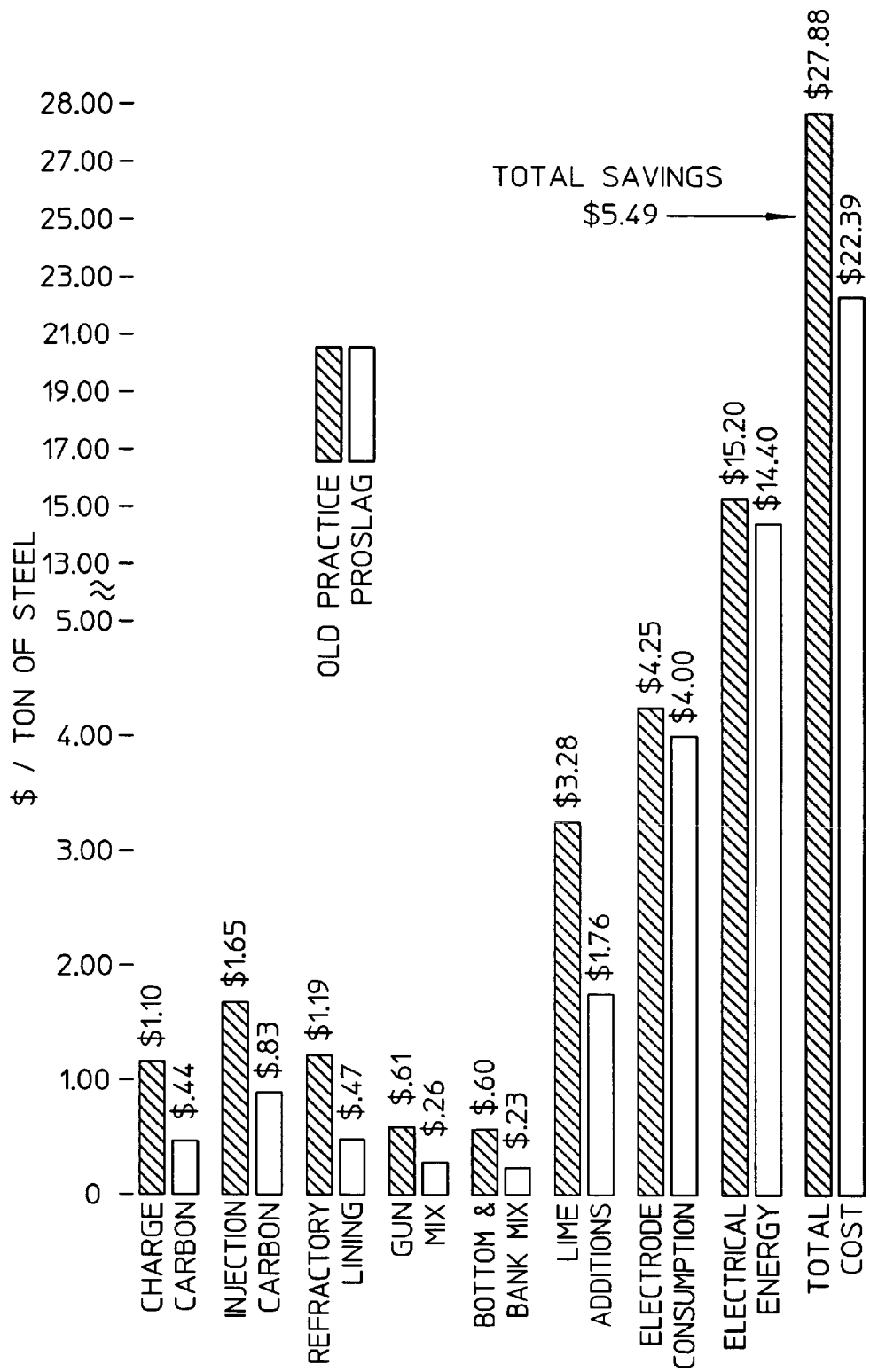
FIG. 9 illustrates bar graphs of categories of cost savings and a total cost saving arising out of the use of the slag conditioner of the present invention.

Referring to FIG. 9, the use of the slag conditioner of this invention in steelmaking provides unexpected benefits to the operation of the steel making furnace including cost savings over $5.00 per ton of steel. Many factors of the steel making operation contribute to this cost savings. Items of consumable materials typically reduced by more than 50% per ton of steel are the cost to provide charge carbon from $1.10 to $0.44; injection carbon from $1.65 to $0.83; refractory lining from $1.19 to $0.47; gun mix from $0.61 to $0.26; bottom and bank mix from $0.60 to $0.23; lime additions from $3.28 to $1.76; and electrode consumption from $4.25 to $4.00. The remaining item is the electrical energy cost, reduced from $15.20 to $14.40.

FIG. 4 demonstrates that requiring less MgO units still produces the same MgO in the slag The charge weight of briquette material can be reduced. Therefore, the weight of MgO units added to the furnace is reduced while the same MgO level can be realized in the slag. The briquettes also permitted a reduction to the burnt lime added to the furnace. This in turn lowered the CaO and therefore the CaO to $SiO_2$ ratio. Liquid slag at a lower CaO to $SiO_{2\ ratio}$ to is known to favor lower FeO in the slag. More iron could therefore be converted to steel therefore increasing the yield of tapped steel. The slag conditioner may be introduced to electric steelmaking furnace in an amount needed to raise the MgO level in high lime calcium-silicate slag to between 5% to 14%, although up to 18% is useful and thereby impart a creamy slag texture, non leaching for soluble MgO, foam producing to increasing slag volume, and protectively coat refractory sidewalls of the electric steelmaking furnace. The slag conditioner is introduced in an electric furnace in sufficient quantities to raise the MgO level in a high lime calcium-silicate slag to up to 22% when the CaO to $SiO_2$ ratio is below 1.5. In the event of the failure to develop a creamy slag texture and the slag has the appearance of thin water like texture or consistency and further the slag does not foam well, the quantity of slag conditioner introduced is selected as an amount sufficient to raise the MgO level in a high lime calcium-silicate slag to up to 14% by adding more burned lime to increase the CaO to $SiO_2$ ratio to between 1.8 and 2.1. The charging of the furnace may includes charging an iron bearing metal at two different intervals of time into and between 20%-80% of the slag conditioner is charged during a first of the two internals of time and between 20%-80% of the slag conditioner is charged during a second of the two intervals of time. Typically, at least 20% of the calculated slag conditioner is charged during a time of heating the iron bearing metal in the furnace. In addition, an objective is to combine other compatible additives into the briquette slag conditioner with or without carbon, to provide finer more reactive materials efficiently to the steel or to the slag. Additives introduced in this manner may include silicon carbide and ferrosilicon for reducing other valuable oxides to metal such as chromic oxide to chrome metal in the manufacture of stainless steel. Alternately, burned dolomite can be added to provide finer more reactive particles of CaO and MgO. Incorporating the finer materials in a briquette form ensures the materials will reach the slag bath interface and be reacted efficiently.

Heat times in terms of power ON time are shortened and therefore energy consumption and electrode usage are decreased for additional savings. Very large electric arc or direct current furnaces, more than 26 or 28 feet in diameter, are known to be difficult to coat with slag. The use of briquettes with even larger particles of dead burned magnesium oxide, up to 6 mm in size in a briquette with carbon from coal will significantly improve slag coatings on such furnace sidewalls.

Trails were conducted in an argon oxygen decarburization vessel known as an AOD, for the refining of stainless steel. Results proved that chrome and silicon units chemically reduced from oxides in the slag, were increased in the final metal, thereby increasing the efficiency of the process. A partially refined charge of steel having selected alloying materials in an electric arc furnace is transferred to an argon-oxygen-decarburization vessel and a slag conditioner of the present invention is added to achieve the chemical reductions of the chrome and silicon oxides.

The use of slag conditioners of this invention also facilitates the production of higher quality steel. When the use of the slag conditioner of the present invention produces a reduction in charge carbon, a major source of sulfur, a concurrent benefit is the avoidance of an addition of sulfur to the steel, a quality advantage. When nitrogen is a critical in the specification for the steel grade, the improved foaming action of the slag will fill more of the furnace volume and direct the electric arc down into the steel and away from the upper atmosphere in the furnace. This protection of the arc minimizes the production of concentrated nitrogen from the air in the furnace and results in lower nitrogen levels in certain grades of steel that need to be produced within tight specifications.

Another composition for producing a slag conditioning briquette uses 46% dead burned magnesium oxide, 18% Light burned MgO, 28% coal, and 8% water. The ingredients were mixed to form a tempered mixture to a machine for making 40×30 mm briquettes. Observations were that the carbon from the briquette replaced more then three times as much charge carbon from coarse coal. The carbon in the bath remained at the same level. Unexpectedly, the charge coal, 2000 pounds per heat, had been successfully eliminated as a flux cost. In addition, MgO provided from the briquette yielded higher MgO in the finished slag then the MgO from the coarse 15×3 mm dead burned magnesium oxide using in the prior art practice.

Increasing the strength of the briquettes occurs by using a mixture of 38% dead burned magnesium oxide 3×0 mm, 25% light burned MgO, 25% coal and 12% water. After mixing, the resultant composition was processed in a briquette machine and the resultant briquettes contained 62% MgO and 20% Carbon with a 10% ignition loss.

A trial in a furnace deigned for tapping 130NT of steel per heat confirmed that 2880 pounds of briquettes could replace 2400 ton of dead burned magnesium oxide coarse 15×3 mm material, and at lower cost. By a more direct other measure, 1728 pounds of MgO units from the briquettes replaced 2208 pounds of MgO units from coarse dead burned magnesium oxide.

In cases where carbon is not a valuable or important addition to the slag or steel process, briquettes could be made from dead burned magnesium oxide, 3×0 mm with light burned MgO about 200 mesh with water to form the bond. These briquettes will be applicable in some electric furnaces but more applicable in the BOF vessels where MgO is still required and lime and lime plus dolime are still used. These briquettes have an MgO component of about 65% but provide very fine MgO particles and intermediate sized MgO to act as discrete particles to increase the bulk viscosity of the slag. In this case, a briquette composition of 30 to 85% dead burned magnesium oxide 3×0 mm size can be mixed with 20% to 70% light burned magnesia 200 mesh and enough water, 8% to 30%, to set the material acting as a binder. The resulting briquette will test at about 60% to 70% MgO, the balance ignition loss and ash from the impurities in the magnesite starting raw materials.

An experimental slag conditioner composition C comprised of 50% dead burned magnesium oxide, 3×0 mm, 25% light burned magnesium oxide, 25% Coal 3×0 mm, was mixed with about 12% water by weight. The mixture is tempered by mixing to create a moldable mass and then compressed in a high-pressure briquette machine. The final composition contained about 62% MgO, 18 to 20% carbon, and about 12% weight loss after coking. A trial was conducted in a steel mill where burned dolomite was used to provide MgO to the slag and charge carbon was added to increase the carbon in the metal on tapping to about 0.06%. A weight of 3300 pounds of briquettes was charged into the furnace to replace all the dolime. The MgO content of the slag was maintained at 10% and the carbon content of the metal was about 0.08%. The higher carbon from the briquettes permitted the reduction of 3000 pounds of charge carbon in the form of coarse coal. Additionally, there was a reduction to the injection carbon. The net savings from the use of the briquettes was significant.

A further trial was conducted at a steel mill having a standard practice of adding dead burned magnesium oxide 15×3 mm for the MgO values, and in a normal practice, used 25 pounds of injection carbon per ton of steel to adequately foam the slag for furnace protection. During heats where the briquette slag conditioner of this invention was used, the injection carbon, in this case anthracite coal fines, was introduced at a rate which was reduced to less than 10 pounds per ton of steel, more than a 60% reduction, giving additional and unexpected savings. The slag foaming coated the furnace walls while the furnace was operated on full power for much of the heat.

A charge of 2500 pounds of briquettes was added to the furnace to provide part of the MgO needed to satisfy the slag. After it was observed that the MgO in the slag was 11%, higher than required, the dolime was cut back to 3000 pounds from a standard weight of 9000 pounds normally added. 3300 pounds of briquettes was charged into the furnace to replace all the MgO supplied by burned dolomite. In addition, the heat was tapped at a higher temperature and the oxygen was higher than desired, indicating that the power on time and oxygen blowing time was excessive and could be reduced. The results of better slag foaming, better furnace wall coating, better carbon yield, better MgO solution in the slag were the result of the use of the briquettes and reduction of the dolime. The heat time was reduced by between 1 and 2 minutes, and the oxygen consumption cut back. Significant savings were due to the use of briquettes in this furnace operation.

Experimental slag conditioner composition D comprised of 52% dead burned magnesium oxide, 6×0 mm, 25% Dead burned magnesium oxide, 200 mesh, 22% Coal 3×0 mm, mixed with about 6% water and 5% lignosulfonate binder solution by weight. The mixture was tempered to form a moldable mass and then compressed in a high-pressure briquette machine. The final composition contained about 68% MgO, 16 to 18% carbon, and about 6% weight loss after coking. A trial was conducted in a steel mill where dead burned magnesium oxide was used to provide MgO to the slag and charge carbon was added to increase the carbon in the metal on tapping to about 0.06%. A weight of 4000 pounds of briquettes was charged into the furnace to replace all the dead burned magnesium oxide. The MgO content of the slag was maintained at 10% and the carbon content of the metal was about 0.04%. The higher carbon from the briquettes permitted the reduction of 1000 pounds of charge carbon in the form of coarse coal.

While the present invention has been described in connection with the preferred embodiments of the various figures, it is to be understood that other similar embodiments may be used or modifications and additions may be made to the described embodiments for performing the same function of the present invention without deviating there from. Therefore, the present invention should not be limited to any single embodiment, but rather construed in breadth and scope in accordance with the recitation of the appended claims.

The invention claimed is:

1. A slag conditioner comprising by weight 2% to 30% binder and the remainder a mixture, the mixture comprising:
   20-75% of a first burned aggregate component comprised of particles less than 8 mm of which at least 30% are 0.2 mm or greater and containing 35-94% MgO;
   25-50% of a second burned aggregate component comprised of particles having a size less than 100 mesh and containing MgO; and
   up to 50% carbonaceous slag-making additive.

2. The slag conditioner according to claim 1, wherein the first burned aggregate component is selected from dead burned magnesite, dead burned dolomite, light burned dolomite or a combination thereof.

3. The slag conditioner according to claim 1, wherein the second burned aggregate component is selected from dead burned magnesite, light burned magnesite, or a combination thereof.

4. The slag conditioner according to claim 1, wherein the first burned aggregate component contains between 80% and 94% MgO.

5. The slag conditioner according to claim 1, wherein the second burned aggregate component contains at least 80% and not more than 97% MgO.

6. The slag conditioner according to claim 1, wherein the first burned aggregate component comprises particles of 6 mm or less of which at least 30% are 0.2 mm or greater.

7. The slag conditioner according to claim 1, wherein the first burned aggregate component comprises particles of 3 mm or less of which at least 30% are 0.2 mm or greater.

8. The slag conditioner according to claim 1, wherein the first burned aggregate component comprises particles of 1 mm or less of which at least 30% are 0.2 mm or greater.

9. The slag conditioner according to claim 1, wherein the second burned aggregate component further comprises about 80% or more particles less than 200 mesh.

10. The slag conditioner according to claim 1, wherein the slag-making carbonaceous additive is selected from the group consisting of: coal, anthracite coal, metallurgical coke, petroleum coke, and graphite.

11. The slag conditioner according to claim 1, wherein the slag-making carbonaceous additive has a carbon content of 78%-99.8%.

12. The slag conditioner according to claim 1, wherein the slag-making carbonaceous additive has a particle size of less than 6 mm.

13. The slag conditioner according to claim 1, wherein the slag-making carbonaceous additive has a particle size of 3 mm or less.

14. The slag conditioner according to claim 1, wherein the slag-making carbonaceous additive has a particle size of 1 mm or less.

15. The slag conditioner according to claim 1, wherein the binder is chemically reactive with one or more components of the mixture.

16. The slag conditioner according to claim 1, wherein the binder is water.

17. The slag conditioner according to claim 1, wherein the binder is 5-25% water.

18. The slag conditioner according to claim 1, wherein the binder includes sufficient liquid to form a moldable mixture and is selected from the group consisting of: sodium silicate, ligosulfonate, lignosulfonate solutions, hydrochloric acid, sulfuric acid, magnesium chloride, magnesium sulphate, molasses, pitch, tar, asphalt, bentonite, clays, and resins, or a combination thereof.

19. The slag conditioner according to claim 18, wherein the binder further contains water.

20. The slag conditioner according to claim 1, wherein the binder is an organic binder.

21. The slag conditioner according to claim 20, wherein the binder contains 6% or less water.

22. A slag conditioner according to claim 1, wherein the binder agglomerates the mixture by adhesion and is selected from the group consisting of pitch, tar, and asphalt.

23. The slag conditioner according to claim 1, further comprising up to 50% compatible filler material.

24. The slag conditioner according to claim 23, wherein the compatible filler material is selected from the group consisting of: silicon carbide, ferrosilicon, ferrochrome, ferrosilicomanganese, iron oxide, chrome ore, mill scale, limestone, dolomite, raw magnesite, recycled Mag-Carbon bricks, and recycled magnesite bricks or a combination thereof.

25. A slag conditioner according to claim 1, wherein the mixture comprises:
    20-70% of a first burned aggregate component comprised of particles less than 8 mm of which at least 30% are 0.2 mm or greater and containing 35-94% MgO;
    25-50% of a second burned aggregate component comprised of particles having a size less than 100 mesh and containing MgO; and
    5-50% carbonaceous slag-making additive.

26. A method of producing a slag conditioner comprising:
    creating an aggregate mixture comprising: 20-75% of a first burned aggregate component comprised of particles less than 8 mm of which at least 30% are 0.2 mm or greater and containing 35-94% MgO; 25-50% of a second burned aggregate component comprised of particles having a size less than 100 mesh and containing MgO; and up to 50% slag-making additive;
    combining the mixture with 2-30% binder; and
    compressing said mixture under a sufficiently high pressure to produce a briquette.

27. A method of producing a slag conditioner according to claim 26, wherein the aggregate mixture comprises 20-70% of a first burned aggregate component comprised of particles less than 8 mm of which at least 30% are 0.2 mm or greater and containing 35-94% MgO; 25-50% of a second burned aggregate component comprised of particles having a size less than 100 mesh and containing MgO; and 5-50% slag-making additive.

28. The method of producing a slag conditioner according to claim 26, wherein the aggregate mixture and the binder are blended in a batch quantity in a mixer and compressed using a machine selected from a group consisting of: a briquette machine, a mechanical press, a hydraulic press, a friction screw press, a rotary press, an inclined pelletizing disc and an extruder to form agglomerates of the blended mixture.

* * * * *

UNITED STATES PATENT AND TRADEMARK OFFICE
CERTIFICATE OF CORRECTION

| | | |
|---|---|---|
| PATENT NO. | : 7,914,599 B2 | Page 1 of 1 |
| APPLICATION NO. | : 10/990678 | |
| DATED | : March 29, 2011 | |
| INVENTOR(S) | : Joseph L. Stein et al. | |

It is certified that error appears in the above-identified patent and that said Letters Patent is hereby corrected as shown below:

<u>Title Page, Item</u> (74), Attorney, Agent, or Firm: "Web" should read --Webb--

Signed and Sealed this
Twentieth Day of September, 2011

David J. Kappos
*Director of the United States Patent and Trademark Office*